United States Patent [19]

Weed

[11] 4,088,848
[45] May 9, 1978

[54] HOLDER FOR MICROPHONES AND THE LIKE

[76] Inventor: Howard S. Weed, 2337 S. Manchester, Anaheim, Calif. 92802

[21] Appl. No.: 772,667

[22] Filed: Feb. 28, 1977

[51] Int. Cl.² .................................................. H04M 1/04
[52] U.S. Cl. ............................ 179/146 R; 248/309 R
[58] Field of Search .............. 179/146 R; 248/222.4, 248/309 R, 359, 360, 221.3, 222.1

[56] References Cited

U.S. PATENT DOCUMENTS

| 1,040,053 | 10/1912 | Taft | 248/309 R |
| 2,467,383 | 4/1949 | Huff | 179/146 R |

Primary Examiner—William C. Cooper
Attorney, Agent, or Firm—Harvey C. Nienow

[57] ABSTRACT

A holder for microphones and the like, attachable to a vertical wall and having a ledge member whereon the usual mounting button of a microphone is caused to rest by the force of gravity and a spring member fixed relative to said ledge member. Said spring member is formed with a slot, and the resiliency of said spring member urges said button to a position on said ledge member. Such resiliency can be overcome to enable said button to pass clear of the ledge member when desired for removal of the microphone.

6 Claims, 6 Drawing Figures

HOLDER FOR MICROPHONES AND THE LIKE

The present invention relates generally to holders for microphones and the like and more particularly to such holders which are capable of retaining a microphone in a fixed position relative to a vertical wall or similar mounting surface.

Vehicle communications systems are very popular today and communications devices of all types and descriptions have enjoyed widespread use within the United States during the past several years. Also, for many decades, various types of radio communication devices have been employed in vehicles operated by emergency public service organizations such as police and fire departments and the like.

Within recent years, vehicular communications systems for private citizens have enjoyed particular popularity as represented by citizens' band units which can receive and transmit voice communications from vehicles or base stations.

Heretofore, microphones for such vehicular communications systems have employed a mounting button which was caused to engage a slotted bracket mounted on the instrument panel or other vertical surface to effectively position the microphone relative to the vehicle. To remove such microphone from its mounted position, it had to be forced upwardly until the mounting button was free of the slotted bracket. Frequently such brackets firmly engaged the microphone mounting button so that a considerable force was required to remove the microphone for the intended use. As a result, the user's hand or other objects were frequently abruptly contacted or struck, causing injury or other damage.

It is an object of the present invention to provide a holder for a microphone or the like which is capable of firmly retaining the microphone in its mounted position and thereafter allowing the microphone to be removed for use.

Another object of the present invention is to provide a holder for a microphone or the like as characterized above which enables the microphone to be removed by a downward motion.

A still further object of the present invention is to provide a holder for a microphone or the like as characterized above which employs a ledge member against which the microphone mounting button rests, and a spring member which urges said button onto said ledge member but which can be overcome for removal of the microphone.

A still further object of the present invention is to provide a holder for a microphone or the like as characterized above wherein the resiliency of the spring member can be varied as desired, to thereby vary the amount of force required for removal of the microphone from its mounted position.

An even further object of the present invention is to provide a holder for a microphone or the like as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
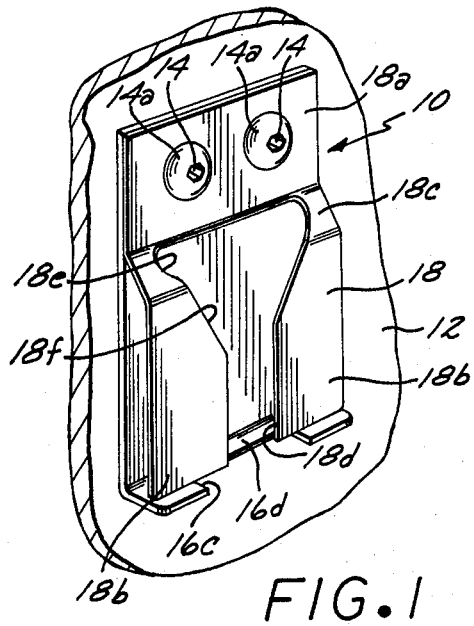
FIG. 1 is a fragmentary sectional view of a holder according to the present invention.

Referring to FIG. 1 of the drawings, there is shown therein a holder 10 according to the present invention. It is held in place against any appropriate vertical wall or surface 12 by suitable mounting bolts 14 having mounting nuts 14a. It is contemplated that mounting surface 12 might be any appropriate surface or wall such as found on the instrument panel of a motor vehicle or the like.

Holder 10 comprises a generally L-shaped ledge member 16 having a first leg 16a and a second leg or ledge 16b. Leg 16a is formed with a pair of through openings for accomodating the bolts 14 which retain the holder 10 in mounted position.

Figure 5:
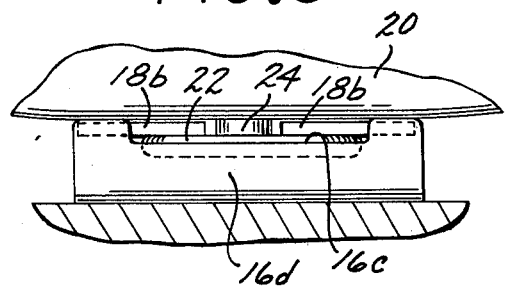
FIG. 5 is a bottom view of the holder of FIG. 3, taken substantially along line 5—5 of FIG. 3.

Leg 16b of ledge member 16 is formed at an angle to leg 16a and is provided with a cutout 16c of such size and shape as to leave a ledge portion 16d as shown most clearly in FIGS. 1 and 5 of the drawings.

A spring member 18 is provided, having an upper portion 18a and a lower portion 18b separated by a generally offset intermediate portion 18c. The upper portion 18a is formed with a pair of through openings for accomodating the mounting bolts 14. The offset of intermediate portion 18c is formed to place the upper and lower portions 18a and 18b in generally parallel planes, as shown in the drawings.

Spring member 18 is further formed with a slot 18d in the lower portion 18b and an enlarged opening 18e in the intermediate portion 18c. A tapered opening 18f interconnects the enlarged opening 18e and slot 18d as shown most clearly in FIG. 1 of the drawings.

To enable the holder 10 to withstand excessive wear as well as variations in temperature and moisture conditions, it has been found desirable to form the members 16 and 18 of stainless steel. However, it is well realized that many types of plastics available today would be suitable for providing the necessary strength and resistance to varying environmental conditions.

The spring member 18 is formed of material which is softly resilient, stiff enough to retain the microphone in proper position as will hereinafter appear, but nonetheless resilient enough to permit removal of the microphone as desired.

Figure 2:
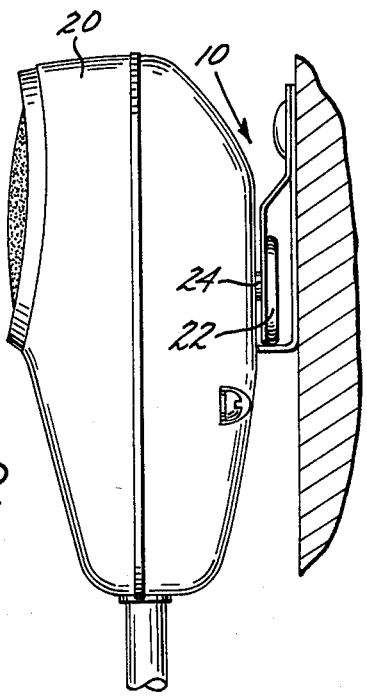
FIG. 2 is a fragmentary side elevational view showing a microphone in mounted position on the holder of FIG. 1.

The typical microphone, as shown most clearly at 20 in FIG. 2 of the drawings, includes a mounting button 22 which is firmly secured relative to the microphone but which is spaced therefrom by a mounting screw or spacer 24.

The slot 18d of spring member 18 is of such size or width as to accomodate the spacer 24 and button 22 without causing the parts to bind in any way. At the same time, the slot 18d must be small enough to prevent the button 22 from passing therethrough from the mounting position as shown in FIGS. 2 and 3 of the drawings.

The enlarged opening 18e in the intermediate portion 18c of spring member 18 must be of sufficient size to allow the button 22 to loosely pass therethrough. The tapered opening 18f is operable to engage the spacer 24 to cause it to be directed to the slot 18d by the force of gravity as well as the motion of the individual using the microphone.

Figures 3, 4:
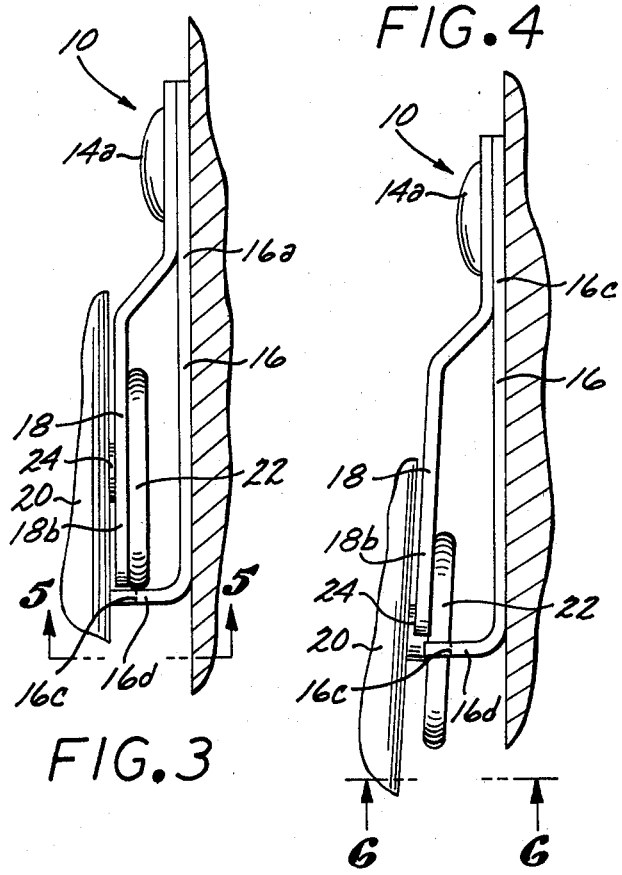
FIG. 3 is a fragmentary side elevational view of the holder of FIG. 2.
FIG. 4 is a similar elevational view showing the microphone being removed.

As shown most clearly in FIG. 3 of the drawings, the button 22 is held by gravity as well as the resiliency of the lower portion 18b of spring member 18 against the ledge portion 16d of ledge member 16. In this condition, the microphone 20 is firmly held in place, the force required by the spring member 18 to retain the button 22 against the ledge portion 16 being minimal.

Figure 6:
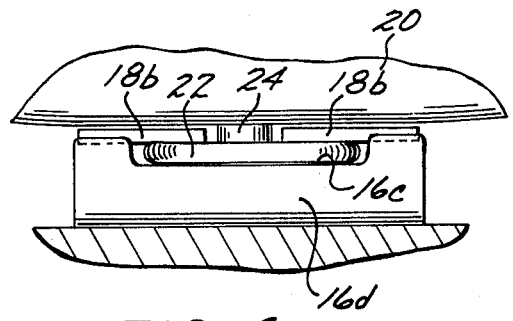
FIG. 6 is a bottom view taken substantially along line 6—6 of FIG. 4.

When it is desired to remove the microphone 20, it is merely necessary for the user to pull the microphone away from the mounting surface 12. This can be accomplished by tilting the microphone such as to move the upper portion thereof toward the surface 12, and by pulling the microphone downward and away from surface 12. This causes the lower portion 18b of spring member 18 to gently but resiliently move away from the mounting surface 12, enabling the button 22 to easily pass through the cutout 16c in ledge member 16b as shown most clearly in FIGS. 4 and 6 of the drawings.

Thus, the microphone is quickly and easily removed from the holder 10.

When it is desired to return the microphone 20 to its mounted position as shown in FIG. 2, it is a simple matter for the user to position the microphone such that the button 22 is above the enlarged opening 18e and thereafter to allow the force of gravity to take the button 22 downwardly onto the ledge portion 16d as above explained.

Although I have shown and described certain specific embodiments of my invention, I am well aware that many modifications thereof are possible. The invention is not to be restricted except as required by the appended claims.

I claim:

1. A holder for microphones and the like comprising in combination,
   a ledge member,
   and a spring member fixed relative to said ledge member having a marginal edge in close proximity thereto,
   said spring member being further formed with a slot extending through said marginal edge and adapted to receive a mounting button of a microphone, said button being held against said ledge member by gravity and said spring member until said marginal edge of said spring member is pulled away from said ledge member.

2. A holder for microphones and the like according to claim 1,
   wherein said spring member is formed with an offset having an enlarged opening contiguous with said slot.

3. A holder for microphones and the like according to claim 2,
   wherein said ledge member is formed with a cutout through which said button can pass, said spring member normally urging said marginal edge to a position preventing such passage.

4. A holder for microphones and the like according to claim 3,
   wherein said slot at said enlarged opening is tapered from said opening to said slot to direct said button toward the marginal edge of said spring member and toward said ledge member near said cutout.

5. A holder for microphones and the like according to claim 4,
   wherein said ledge member is L-shaped and said offset in said spring member separates an upper portion of said spring member from a lower portion thereof, said upper portion being positioned adjacent one leg of said L-shaped ledge member and said lower portion being spaced therefrom but parallel thereto and having said marginal edge in close proximity to the other leg of said ledge member.

6. A holder for microphones and the like according to claim 5,
   wherein said lower portion of said spring member is formed with said slot and is spaced from said one leg of said spring member a distance sufficient to loosely accomodate said mounting button.

* * * * *